(12) United States Patent
Phillipps

(10) Patent No.: US 6,335,817 B1
(45) Date of Patent: Jan. 1, 2002

(54) MIRROR CONTROLLED DISPLAY DEVICE

(76) Inventor: John Quentin Phillipps, 30 Mount Avenue, Ealing, London W52QJ (GB)

( * ) Notice: Subject to any disclaimer, the term of this patent is extended or adjusted under 35 U.S.C. 154(b) by 0 days.

(21) Appl. No.: 09/135,015

(22) Filed: Aug. 17, 1998

(51) Int. Cl.[7] .............................................. G02B 26/00
(52) U.S. Cl. ...................... 359/290; 359/223; 359/619; 359/599; 359/291; 385/36; 385/146; 362/31; 250/201.9
(58) Field of Search ................................ 359/290, 291, 359/293, 318, 457, 619, 621, 623, 223, 599; 385/36, 133, 146; 362/31, 268; 250/201.9, 227.11; 349/61, 62, 69, 112, 64

(56) References Cited

U.S. PATENT DOCUMENTS

| | | | | |
|---|---|---|---|---|
| 5,144,462 A | * | 9/1992 | Otsuka et al. ............... | 359/290 |
| 5,256,869 A | | 10/1993 | Lin et al. .................. | 250/201.9 |
| 5,579,149 A | | 11/1996 | Moret et al. ................ | 359/223 |
| 5,739,931 A | * | 4/1998 | Zimmerman et al. ....... | 359/619 |
| 5,748,828 A | * | 5/1998 | Steiner et al. ............... | 385/146 |
| 5,774,257 A | * | 6/1998 | Shibata et al. ............... | 359/291 |
| 5,818,627 A | * | 10/1998 | Perlo et al. .................. | 359/619 |
| 6,002,464 A | * | 12/1999 | Fujisawa et al. ............. | 359/599 |
| 6,155,698 A | * | 12/2000 | Yoon et al. .................. | 359/599 |

FOREIGN PATENT DOCUMENTS

| | | |
|---|---|---|
| EP | 0-675-477 A1 | 4/1995 |
| GB | 2-045-991 A | 11/1980 |
| WO | WO 95/29555 | 11/1995 |
| WO | WO 96/36184 | 11/1996 |

* cited by examiner

*Primary Examiner*—Loha Ben
(74) *Attorney, Agent, or Firm*—McDermott, Will & Emery

(57) ABSTRACT

A pixel of a display device is controlled by a tilting mirror. When the mirror is in a first position, light from a light source is directed to a light diffusing structure for viewing. If, however, the mirror is tilted, the light is directed along a path which prevents it from entering the light diffusing structure. Thus, the brightness of a pixel is controlled by tilting a mirror. In one embodiment, the colour of an individual pixel can be controlled by controlling the degree of tilt of a mirror.

42 Claims, 6 Drawing Sheets

MIRROR CONTROLLED DISPLAY DEVICE

FIELD OF THE INVENTION

The present invention relates to a display device in which pixels are controlled by respective mirrors.

BACKGROUND TO THE INVENTION

U.S. Pat. No. 5,517,347 discloses a directly viewable display device, that is it does not project an image onto a screen, in which the appearance of each pixel is controlled by the state of a respective mirror. However, it suffers from the problem that the image has a smaller area than the display device because light enters and leaves the device obliquely.

SUMMARY OF THE INVENTION

It is an object of the present invention to overcome the afore-mentioned problem of a prior art display device and provide a display device, in which each pixel is controlled by the state of a respective mirror, that can be viewed face on.

According to the present invention, there is provided a display device comprising a front face, means defining an array of directly viewable pixels and a respective mirror for each pixel, the state of which controls the appearance of the pixel, wherein light beams are reflected by said mirrors through diffusing means to a viewing position, emerging from the front face in a direction substantially perpendicular thereto, the diffusing means expanding said beams for viewing.

Preferably, light source means is provided for supplying pixel illuminating light to the mirrors and the light paths from the light source means to the mirrors are substantially equal in length.

Preferably, a display device according to the present invention includes a light source layer and a control layer containing the mirrors, wherein the light source layer and the control layer are substantially co-extensive.

The preferred lighting arrangements of the present invention overcome the subsidiary problem of non-uniform pixel illumination that arises with the side-lit arrangement disclosed in U.S. Pat. No. 5,517,347.

Preferably, the control layer includes focusing means, associated with each mirror, for reducing the cross-sectional areas of light beams that are reflected by the mirrors to be less that the cross-sectional areas of the visible pixels and a diffusion layer is provided for expanding the beams for viewing. The control layer may be sandwiched between the light source layer and diffusion layer or the light source layer may sandwiched between the diffusion layer and the control layer.

Preferably, each pixel is defined by a cell, each cell comprising means defining a light path selectively extending between a light source and a viewing position. Each light path may selectively be interruptable by changing the state of the respective mirror.

Preferably, each mirror is tiltable between a first position in which its pixel is bright and a second position in which its pixel is dark. However, the mirror could be translated or have their reflectivities changed.

In one embodiment, each cell is provided with a source of light and the light path, when uninterrupted, extends from the source of light through a lens to a tiltable mirror and then to a fixed mirror, which directs light received via the lens and the tiltable mirror through an aperture in the tilting mirror to the diffusing means and thence to a viewing position, the lens focusing light from the light source at a point between the fixed mirror and the viewing position. Conveniently, the lens comprises a fresnel lens.

In another embodiment, each cell is provided with a source of light and the light path, when uninterrupted, extends from the source of light to a fixed concave parabolic mirror and then to a tiltable mirror which directs light in the light path to a viewing position through the diffusing means, the parabolic mirror focusing light from the light source to a point between the tiltable mirror and the viewing position.

The diffusing means may for instance comprise a hemispherical lens and a planoconcave lens.

Advantageously, the light path of at least one cell passes through a colour filter. In this way a colour image can be produced. Preferably, different colour filters are provided in different light paths. A full-colour display is most desirable and this can be achieved by providing different colour filters, e.g. red, green and blue, in different light paths.

In a further embodiment, each cell is provided with a source of light and the light path, when uninterrupted, extends from the source of light via a convex lens to a tiltable mirror which directs light in the light path to a viewing position through the diffusing means, the lens focusing light from the light source to a point between the tiltable mirror and the viewing position. Conveniently, the lens comprises a fresnel lens.

In a yet further embodiment, each cell is provided with a source of a narrow beam of collimated light and the light path, when uninterrupted, extends from the source of light via a fixed planar mirror to a tiltable planar mirror which directs light in the light path to a viewing position through the diffusing means. Preferably, each cell is provided with a plurality of colour filters and the tiltable mirror is controllable to direct light in the light path selectively through the filters.

An electroluminescent polymer may be used as the light source.

The depth of the control layer is conveniently defined by a spacer structure, the spacer structure defining a matrix of cells.

DESCRIPTION OF PREFERRED EMBODIMENTS

Embodiments of the present invention will now be described, by way of example, with reference to the accompanying drawings.

In the following description, terms such as "upper", "lower", "lefthand" and "righthand" refer to aspects of the described devices in the orientation shown in FIGS. 1, 3 and 5, i.e. screen uppermost. These terms are used solely in the interests of clarity and do not imply that the devices are only operational in the orientation used for FIGS. 1, 3 and 5.

Figure 1:
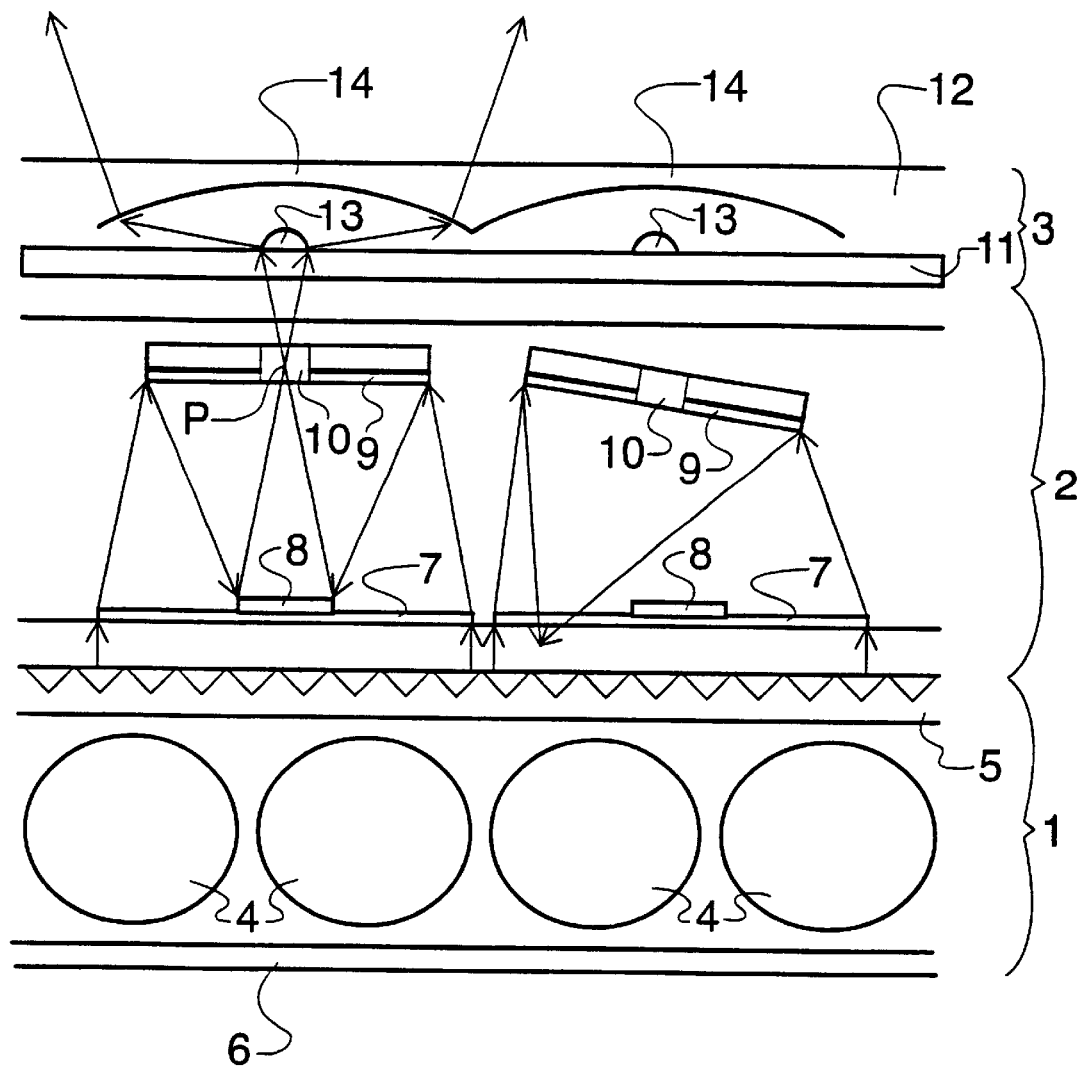
FIG. 1 is a sectional view of two cells of a first embodiment of the present invention.

Referring to FIG. 1, a first embodiment of a display according to the present invention comprises a light source section 1, a control section 2 overlying the light source section 1, and a diffusion section 3 overlying the control section 2.

The structure of the light source section 1 is not critical as long as it produces substantially collimated light for the control section 2. The light source section 1 comprises a serpentine fluorescent lamp 4 above which is located a collimating structure 5. The collimating structure 5 comprises a transparent sheet having a plain face directed to the lamp 4. The other face of the transparent sheet comprises 45° prisms. Below the lamp 4 is a reflective back plate 6. Further information on the light source section 1 can be obtained from U.S. Pat. No. 5,161,041.

FIG. 1 shows two cells of the display, the lefthand cell is shown producing a bright pixel and the righthand cell is shown producing a dark pixel. The control section 2 comprises for each cell a fresnel lens 7, a mirror 8 located in the centre of the fresnel lens 7 and a tiltable mirror 9 opposite the fresnel lens 7. The fresnel lens 7, the mirror 8 and the tiltable mirror 9 are all rectangular. The tiltable mirror 9 has an aperture 10 opening in its mirrored surface opposite the fresnel lens 7. Control signal lines (not shown) are provided so that each tiltable mirror 9 can be individually controlled. The fabrication and detailed structure of the control section 2 is described in U.S. Pat. No. 5,579,149 where the same structure is used for modulating light signals. It should be noted, however, that U.S. Pat. No. 5,579,149 does not disclose a device used to produce a directly viewed image.

The diffusion section 3 comprises a sheet of plastics material 11 affixed to the upper face of the control section 2 and a face panel of plastics material 12 overlying the sheet of plastics material 11. The sheet of plastics material 11 and the face panel 12 are transparent and have integrally formed lenses. The sheet 11 has hemispherical lenses 13 aligned with the apertures 10 in the tiltable mirrors 9 of the control section 2. The sheet 11 is coloured in the regions of the hemispherical lenses 13 so that different cells produce variously red, green and blue colour outputs. The upper surface of the sheet 11 is coloured black between the hemispherical lenses 13. The face panel 12 has a plurality of plano-convex lenses 14 coaxially aligned with respective lenses of the sheet 11. The convex sides of the plano-convex lenses 14 are directed towards the sheet 11.

The cell structure shown in FIG. 1 is repeated many times in two dimensions in the complete display device.

Figure 2:
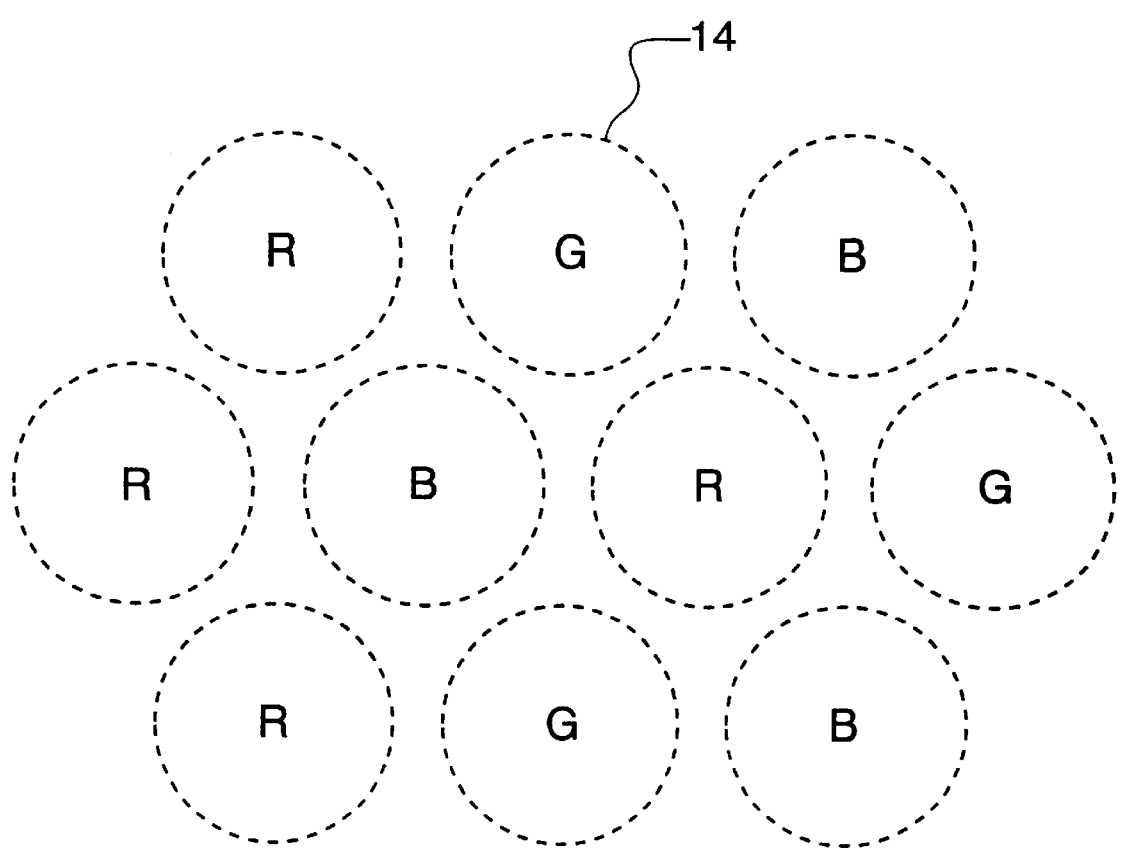
FIG. 2 is a partial front view of the embodiment of FIG. 1 illustrating the arrangement of the cells.

Referring to FIG. 2, the cells are arranged in a honeycomb pattern. The colouration of the sheet 11 (FIG. 1) is arranged such that any group of three mutually adjacent cells will contain a red cell, a green cell and a blue cell, as indicated by R, G and B in FIG. 2.

The operation of the device of FIGS. 1 and 2 will now be described.

If a bright pixel is required no control signals are applied to the tiltable mirror 9 for the pixel's cell. Consequently, the tiltable mirror 9 lies in a plane parallel to the cell's fresnel lens 7. This arrangement is illustrated by the lefthand cell in FIG. 1. Collimated light from the light source section 1, is refracted by the fresnel lens 7 and then reflected from the tiltable mirror 9. The light from the tiltable mirror 9 is reflected back by the mirror 8 on the fresnel lens 7. The fresnel lens 7 focuses the light to a point such that substantially all of the light reflected by the tiltable mirror 9 passes through the aperture 10 to the hemispherical lens 13 of the diffusion section 3. In FIG. 1, the focal point P is shown within the aperture 10. However, this need not be the case. For optimum efficiency, the aperture 10, fresnel lens 7 and the hemispherical lens 13 should be arranged such that all of the light passes through the aperture 10 and the beam has a width no greater than the diameter of the hemispherical lens 13 at the base of the hemispherical lens 13.

The hemispherical lens 13 spreads the light beam which is then incident on the convex side of one of the plano-convex lenses 14. The plano-convex lens 14 reduces the angular width of the beam to balance the requirements for a bright image and a wide viewing angle.

If a dark pixel is required, control signals are sent to the tiltable mirror 9 of the pixel's cell. The control signals cause an electrostatic field to be produced which tilts the mirror 9, as shown by the righthand cell in FIG. 1. Since the tiltable mirror 9 is tilted, the light reflected thereby is not incident on the mirror 8 and so does not pass through the aperture 10 in the tiltable mirror 9 instead, it is directed back to the light source section 1. Consequently, the pixel is darkened.

The generation of images by controlling individual pixels is well known. The skilled person will readily be able to provide a circuit for providing control signals for the mirrors in dependence on an image to be displayed.

Figure 3:
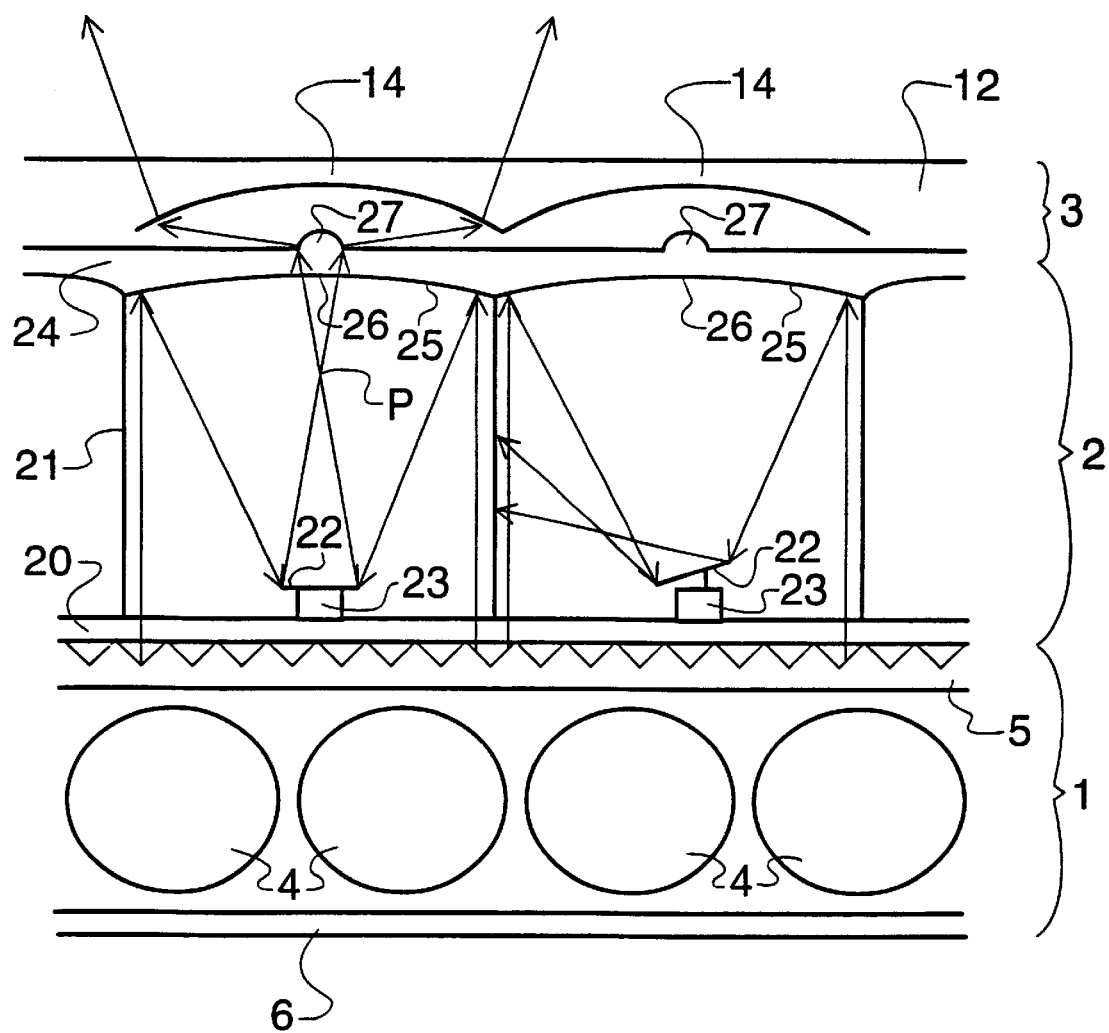
FIG. 3 is a sectional view of two cells of a second embodiment of the present invention.
Figure 4:
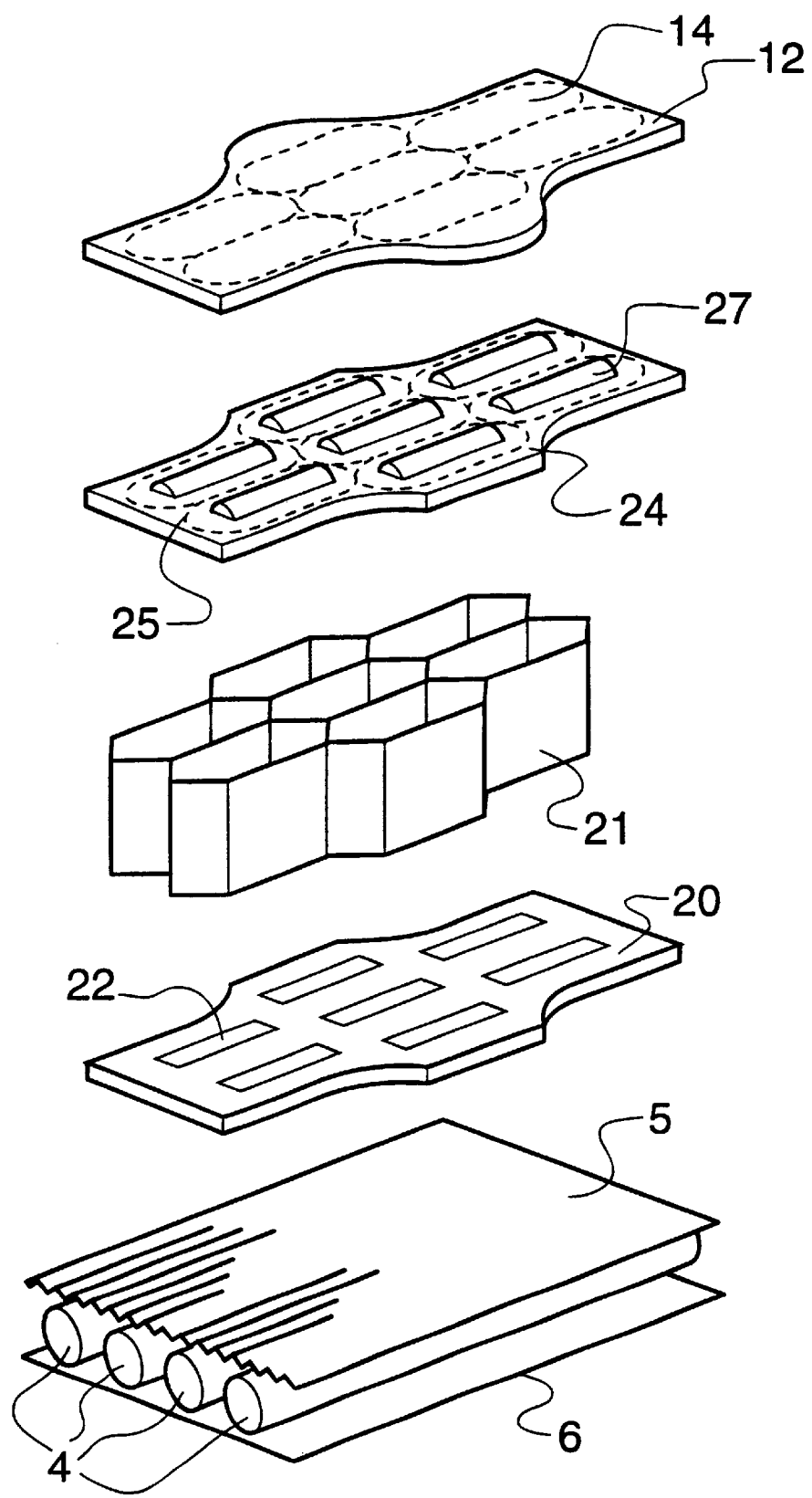
FIG. 4 is an exploded perspective view of seven cells of the second embodiment.

Referring to FIGS. 3 and 4, a second embodiment of a display according to the present invention comprises a light source section 1, a control section 2 overlying the light source section 1, and a diffusion section 3 overlying the control section 2. The light source section is the same as that of the first embodiment described above.

The control section 2 comprises a transparent substrate 20 and a honeycomb spacer structure 21 mounted to the substrate 20. The individual cells of the spacer structure 21 have an elongated hexagonal cross-section and the walls of each cell present a light absorbing surface. The light absorbency may be a characteristic of the material used to form the spacer structure 21 or a surface coating applied to the spacer structure 21. An array of strip-like mirrors 22 is arranged on the substrate 20 so that each mirror 22 is centrally located in a respective cell. Each mirror 22 is supported on the substrate by a small electromechanical actuator 23 for tilting it. The actuators 23 are controlled via conductors formed on the upper surface of the substrate 20. The cells of the control section 2 are closed by the bottom face of a panel 24 which forms the boundary between the control section 2 and the diffusion section 3. The panel 24 is moulded from transparent plastics material. The lower surface of the panel 24 is scalloped and provided with a reflective coating to form a plurality of oval parabolic mirrors 25. Each parabolic mirror 25 closes a respective control section cell. The reflective coating is interrupted in a central strip 26 of each parabolic mirror 25 so that light can pass from the control section 2 to the diffusion section 3.

The diffusion section 3 comprises the upper surface of the panel 24 and a face panel 12. The upper surface of the panel 24 is provided with a plurality of semi-cylindrical lenses 27, each of which is aligned with an interruption in the reflective coating on the lower surface of the panel 24. The upper surface of the panel 24 is coloured black between the semi-cylindrical lens. The face panel 12 is similar to that of the first embodiment save that the plano-convex lenses 14 are oval rather than circular.

The cell structure shown in FIG. 3 is repeated many times in two dimensions in the complete display device.

The operation of the device of FIGS. 3 and 4 will now be described.

If a bright pixel is required no control signals are applied to the mirror actuator 23 for the pixel's cell. Consequently, the mirror 22 lies in a plane parallel to the substrate 20. This arrangement is illustrated by the lefthand cell in FIG. 3. Collimated light from the light source section 1, is reflected from the parabolic mirror 25 towards the tiltable mirror 22. The tiltable mirror 22 reflects the light from the parabolic mirror 25 through the uncoated central region 26 of the parabolic mirror 25 to the diffusion section 3. The parabolic mirror 25 focuses the light to a point such that substantially all of the light reflected by the tiltable mirror 22 passes through the uncoated region 26 to the semi-cylindrical lens 27 of the diffusion section 3. In FIG. 3, the focal point P is shown in an upper region of the control section cell. However, this need not be the case. For optimum efficiency, the uncoated region 26, the parabolic mirror 25 and the semi-cylindrical lens 27 should be arranged such that all of the light passes through the uncoated region 26 and the beam's cross-section matches the footprint of the semi-cylindrical lens 13 at the base of the semi-cylindrical lens 13.

The semi-cylindrical lens 27 spreads the light beam which is then incident on the convex side of one of the plano-convex lenses 14. The plano-convex lens 14 reduces the angular width of the beam to balance the requirements for a bright image and a wide viewing angle.

If a dark pixel is required, control signals are sent to the mirror actuator 23 of the pixel's cell. This causes the actuator 23 to tilt the mirror 22, as shown by the righthand cell in FIG. 3. Since the tiltable mirror 22 is tilted, the light reflected thereby is not incident on the uncoated region 26 and so does not pass through to the diffusion section 3. Instead the light is directed onto a wall of the spacer structure 21 where it is absorbed. Consequently, the pixel is darkened.

Colour filters may be added for the production of colour images.

Figure 5:
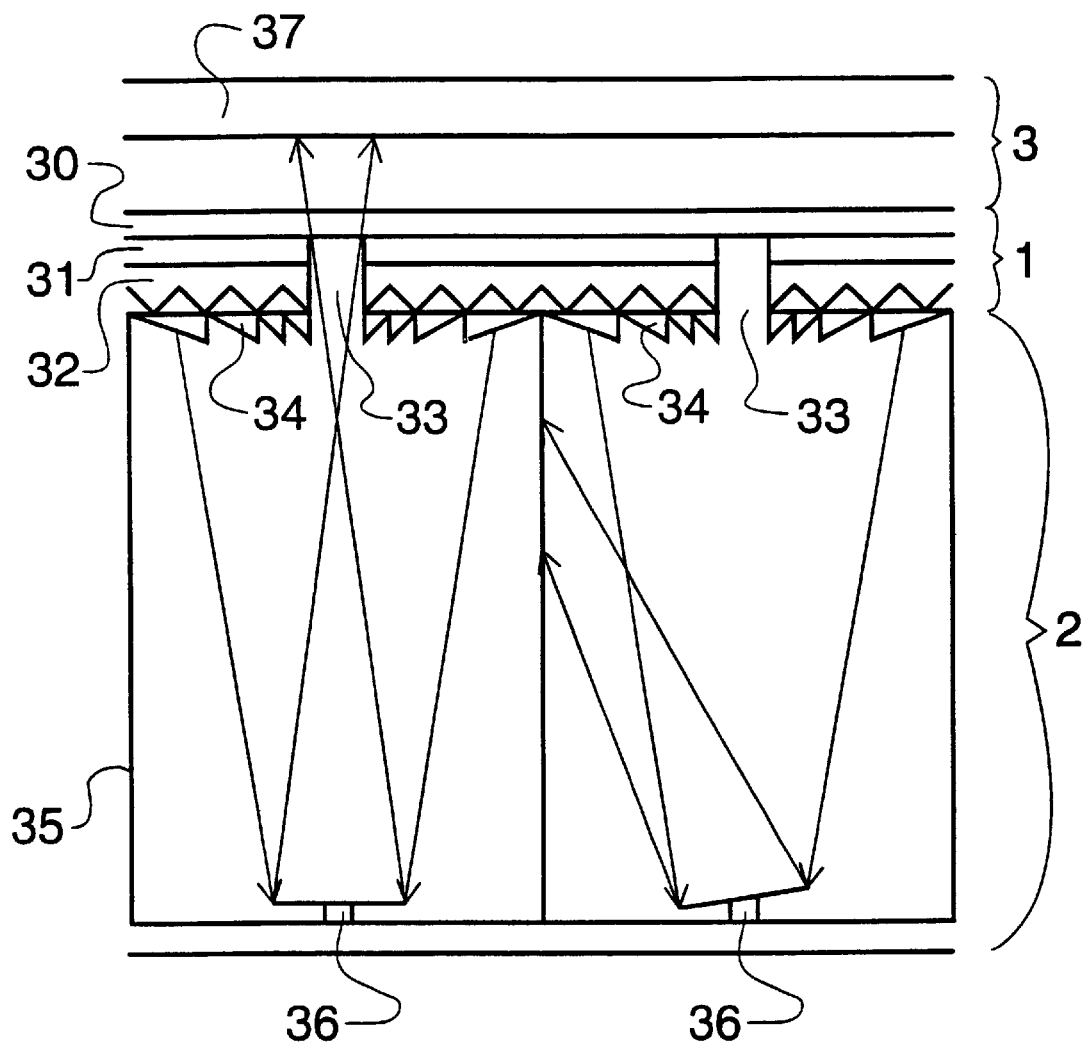
FIG. 5 is a sectional view of two cells of a third embodiment of the present invention.

Referring to FIG. 5, a third embodiment of the present invention comprises a light source section 1 located between a control section 2 and a diffusion section 3.

The light source section comprises a transparent substrate 30, a electroluminescent polymer film 31, mounted to the lower surface of the substrate 30, and a collimating structure 32 comprising a transparent sheet whose lower face consists of 45° prisms. Gaps 33 are provided in the electroluminescent polymer film 31 and the collimating structure 32. The gaps 33 are arranged to be centrally located in respective cells. The upper surface of the substrate 30 is coloured black save for regions overlying and coextensive with the gaps 33. Each cell of the control section 2 comprises a fresnel lens 34 for focusing collimated light from the light source section 1, a spacer structure 35 comprising a matrix of square section cells, and an array of micromirror devices 36 as disclosed in, for example, EP-A-0690329, spaced from the fresnel lens 34 by the spacer structure 35. The walls of the spacer structure 35 are light absorbing.

The diffusion section 3 comprises a sheet 37 of light diffusing material.

The cell structure shown in FIG. 5 is repeated many times in two dimensions in the complete display device.

The operation of the device of FIG. 5 will now be described.

If a bright pixel is required no control signals are applied to the micromirror device 36 for the pixel's cell. Consequently, the mirror of the micromirror device 36 lies in a plane parallel to the electroluminescent polymer film 31. This arrangement is illustrated by the lefthand cell in FIG. 5. Collimated light from the light source section 1, is directed towards the micromirror device 36 by the fresnel lens 34. The micromirror device 36 reflects the light from the fresnel lens 34 through the gap 33 to the diffusion section 3. The fresnel lens 34 focuses the light to a point such that substantially all of the light reflected by the micromirror device 36 passes through the gap 33. In FIG. 3, the focal point P is shown in an upper region of the control section cell. However, this need not be the case. For optimum efficiency, the gap 33, the fresnel lens 34 and the micromirror device 36 should be arranged such that all of the light passes through the gap 33 and presents as large a cross-section as is convenient on the undersurface of the sheet 37 of light diffusing material.

If a dark pixel is required, control signals are sent to the micromirror device 36 of the pixel's cell. This causes the mirror of the micromirror device 36 to tilt, as shown by the righthand cell in FIG. 5. Since the mirror is tilted, the light reflected thereby does not pass through the gap 33 to the diffusion section 3. Instead, the light is directed onto a wall of the spacer structure 35 where it is absorbed. Consequently, the pixel is darkened.

A colour image may be produced by the third embodiment by arranging for the electroluminescent polymer film 31 to emit light of different colours into different cells.

In the foregoing, the provision of bright and dark pixels has been described. It will be appreciated that intermediate brightness levels may be achieved by tilting the tilting mirror sufficient to reduce the amount of light passing to the diffusion layer.

Figures 6, 7:
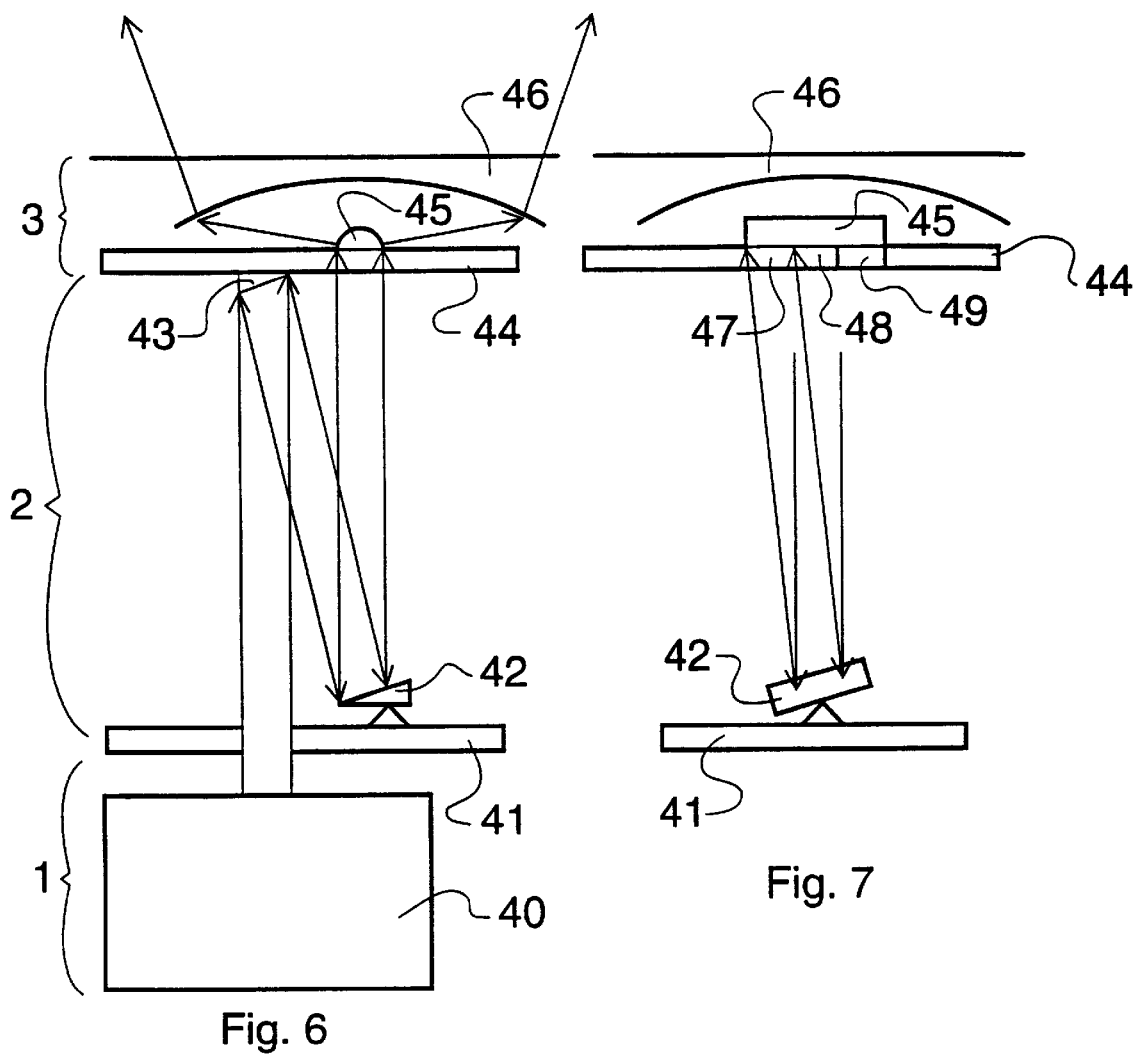
FIG. 6 is a side view of a cell of a fourth embodiment of the present invention.
FIG. 7 is another side view, orthogonal to that of FIG. 6, of the cell of FIG. 6.

Referring to FIGS. 6 and 7, a cell of a display comprises a light source section 1, a control section 2 overlying the light source section 1 and a light diffusing section 3 overlying the control sections 2. The light source section 1 comprises a source 40 of a narrow beam of collimated light. The control section 2 comprises an apertured substrate 41 on which is mounted a tiltable mirror 42 and a fixed, angled mirror 43 mounted to the bottom of the light diffusion section 3. The light diffusion section comprises a panel 44 having a semi-cylindrical lens 45 and a front panel 46 of light diffusing material 46. Three filter regions 47, 48, 49 respectively red, green and blue, are formed in the panel 44 below the lens 45.

Light from the light source section 1 passes through an aperture in the substrate 41 and is incident on the fixed mirror 43. The fixed mirror 43 reflects the light towards the tiltable mirror 42. The light is then reflected towards the diffusion region 3 by the tiltable mirror 42. The tiltable mirror 42 is controllable to direct the light from the fixed mirror 43 to one of the filter regions 47, 48, 49 to produce a coloured pixel or to a region outside of the filter regions 47, 48, 49. Light directed through one of the filter regions 47, 48, 49 is spread by the semi-cylindrical lens 45 and then further diffused by the front panel 46. The upper surface of the panel 44 is black between the lenses 45. Consequently, if light is not directed through one of the filter regions 47, 48, 49, the pixel appears dark.

Figures 8, 9:
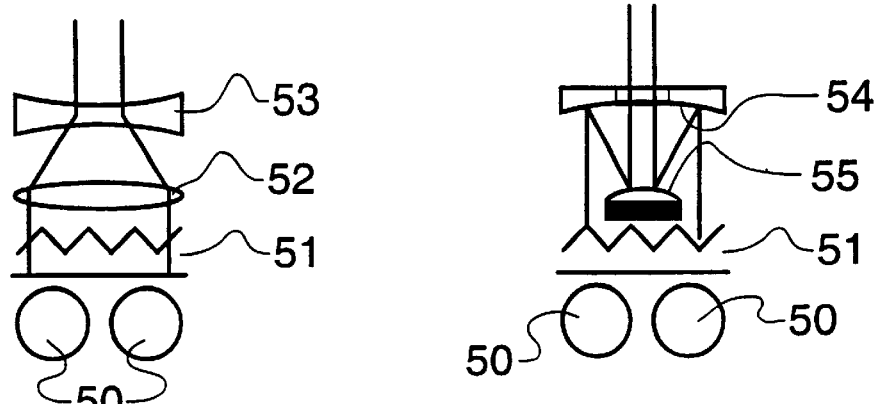
FIG. 8 shows a first source of collimated light.
FIG. 9 shows a second source of collimated light.

Referring to FIG. 8, a source of a narrow beam of collimated light comprises a light source 50, a panel 51 whose upper surface is covered with prisms, a bi-convex lens 52 for receiving light from the panel 51 and a biconcave lens 53 for collimating light focused by the bi-convex lens 52.

Referring to FIG. 9, another source of a narrow beam of collimated light comprises a light source 50, a panel 51 whose upper surface is covered with prisms, a concave parabolic mirror 54 having a hole axially through its centre and a convex parabolic mirror 55 axially aligned with the concave parabolic mirror 54. Light from the panel 51 is focused by the concave parabolic mirror 54 and directed towards the convex parabolic mirror 55. The convex parabolic mirror 55 collimates the focused light and directs it through the hole in the concave parabolic mirror 54.

It will be appreciated that many modifications can be made to the embodiments described herein. For instance, colour displays may be produced by placing colour filters at any point in the light paths. The colour filters may be formed using a pigment or optical thin film interference coatings on mirrors.

What is claimed is:

1. A display device comprising a front face, means defining an array of directly viewable pixels and a respective mirror for each pixel, the state of which controls the appearance of the pixel, wherein light beams are reflected by said mirrors through diffusing means to a viewing position, emerging from the front face in a direction substantially perpendicular thereto, the diffusing means expanding said beams for viewing.

2. A display device according to claim 1, comprising light source means for supplying pixel illuminating light to the mirrors, wherein the light paths from the light source means to the mirrors are substantially equal in length.

3. A display device according to claim 1, comprising a light source layer and a control layer containing the mirrors, wherein the light source layer and the control layer are substantially co-extensive.

4. A display device according to claim 3, wherein the diffusing means comprises a diffusion layer and the control layer includes focusing means, associated with each mirror, for reducing the cross-sectional areas of light beams that are reflected by the mirrors to be less that the cross-sectional areas of the visible pixels.

5. A display device according to claim 4, wherein the control layer is sandwiched between the light source layer and the diffusion layer.

6. A display device according to claim 4, wherein the light source layer is sandwiched between the diffusion layer and the control layer.

7. A display device according to claim 3, wherein the depth of the control layer is defined by a spacer structure, the spacer structure defining a matrix of cells.

8. A display device according to claim 1, including a cell defining each pixel, each cell comprising means defining a light path selectively extending between a light source and a viewing position.

9. A display device according to claim 8, wherein each light path is selectively interruptable by changing the state of the respective mirror.

10. A display device according to claim 8, wherein each mirror is tiltable between a first position in which its pixel is bright and a second position in which its pixel is dark.

11. A display device according to claim 10, wherein each cell is provided with a source of light and the light path, when uninterrupted, extends from the source of light through a lens to a tiltable mirror and then to a fixed mirror, which directs light received via the lens and the tiltable mirror through an aperture in the tiltable mirror to the diffusing means and thence to a viewing position, the lens focusing light from the light source at a point between the fixed mirror and the viewing position.

12. A display device according to claim 11, wherein the lens comprises a fresnel lens.

13. A display device according to claim 11, wherein the diffusing means comprises a hemispherical lens and a plano-concave lens.

14. A display device according to claim 11, wherein the light path of at least one cell passes through a colour filter.

15. A display device according to claim 14, wherein different colour filters are provided in different light paths.

16. A display device according to claim 10, wherein each cell is provided with a source of light and the light path, when uninterrupted, extends from the source of light to a fixed concave parabolic mirror and then to a tiltable mirror which directs light in the light path to a viewing position through the diffusing means, the parabolic mirror focusing light from the light source to a point between the tiltable mirror and the viewing position.

17. A display device according to claim 10, wherein each cell is provided with a source of light and the light path, when uninterrupted, extends from the source of light via a convex lens to a tiltable mirror which directs light in the light path to a viewing position through the diffusing means, the lens focusing light from the light source to a point between the tiltable mirror and the viewing position.

18. A display according to claim 17, wherein the lens comprises a fresnel lens.

19. A display device according to claim 1, including an electroluminescent polymer light source.

20. A display device according to claim 10, wherein each cell is provided with a source of a narrow beam of collimated light and the light path, when uninterrupted, extends from the source of light via a fixed planar mirror to a tiltable planar mirror which directs light in the light path to a viewing position through the diffusing means.

21. A display according to claim 20, wherein each cell is provided with a plurality of colour filters and the tiltable mirror is controllable to direct light in the light path selectively through the filters.

22. A display device comprising a front face, a structure defining an array of directly viewable pixels and a respective mirror for each pixel, the state of which controls the appearance of the pixel, wherein light beams are reflected by said mirrors through a diffuser to a viewing position, emerging from the front face in a direction substantially perpendicular thereto, the diffuser expanding said beams for viewing.

23. A display device according to claim 22, comprising a source of light for supplying pixel illuminating light to the mirrors, wherein the light paths from the source of light to the mirrors are substantially equal in length.

24. A display device according to claim 22, comprising a light source layer and a control layer containing the mirrors, wherein the light source layer and the control layer are substantially co-extensive.

25. A display device according to claim 24, wherein the diffuser comprises a diffusion layer and the control layer includes a lenses, respectively associated with each mirror, for reducing the cross-sectional areas of light beams that are reflected by the mirrors to be less that the cross-sectional areas of the visible pixels.

26. A display device according to claim 25, wherein the control layer is sandwiched between the light source layer and the diffusion layer.

27. A display device according to claim 25, wherein the light source layer is sandwiched between the diffusion layer and the control layer.

28. A display device according to claim 24, wherein the depth of the control layer is defined by a spacer structure, the spacer structure defining a matrix of cells.

29. A display device according to claim 22, including a cell defining each pixel, each cell comprising therein a light path selectively extending between a light source and a viewing position.

30. A display device according to claim 29, wherein each light path is selectively interruptable by changing the state of the respective mirror.

31. A display device according to claim 28, wherein each mirror is tiltable between a first position in which its pixel is bright and a second position in which its pixel is dark.

32. A display device according to claim 31, wherein each cell is provided with a source of light and the light path, when uninterrupted, extends from the source of light through a lens to a tiltable mirror and then to a fixed mirror, which directs light received via the lens and the tiltable mirror through an aperture in the tiltable mirror to the diffuser and thence to a viewing position, the lens focusing light from the light source at a point between the fixed mirror and the viewing position.

33. A display device according to claim 32, wherein the lens comprises a fresnel lens.

34. A display device according to claim 32, wherein the diffuser comprises a hemispherical lens and a plano-concave lens.

35. A display device according to claim 32, wherein the light path of at least one cell passes through a colour filter.

36. A display device according to claim 35, wherein different colour filters are provided in different light paths.

37. A display device according to claim 31, wherein each cell is provided with a source of light and the light path, when uninterrupted, extends from the source of light to a fixed concave parabolic mirror and then to a tiltable mirror which directs light in the light path to a viewing position through the diffuser, the parabolic mirror focusing light from the light source to a point between the tiltable mirror and the viewing position.

38. A display device according to claim 31, wherein each cell is provided with a source of light and the light path, when uninterrupted, extends from the source of light via a convex lens to a tiltable mirror which directs light in the light path to a viewing position through the diffuser, the lens focusing light from the light source to a point between the tiltable mirror and the viewing position.

39. A display according to claim 38, wherein the lens comprises a fresnel lens.

40. A display according to claim 22, including an electroluminescent polymer light source.

41. A display device according to claim 31, wherein each cell is provided with a source of a narrow beam of collimated light and the light path, when uninterrupted, extends from the source of light via a fixed planar mirror to a tiltable planar mirror which directs light in the light path to a viewing position through the diffuser.

42. A display according to claim 41, wherein each cell is provided with a plurality of colour filters and the tiltable mirror is controllable to direct light in the light path selectively through the filters.

* * * * *